United States Patent
Chandramouli et al.

(10) Patent No.: US 10,595,168 B2
(45) Date of Patent: Mar. 17, 2020

(54) ENHANCEMENTS TO EMBMS FOR GROUP COMMUNICATION

(71) Applicants: NOKIA SOLUTIONS AND NETWORKS OY, Espoo (FI); Devaki Chandramouli, Plano, TX (US); Antti Jaakko Pasanen, Helsinki (FI); Curt Wong, Bellevue, WA (US); Rainer Liebhart, Munich (DE)

(72) Inventors: Devaki Chandramouli, Plano, TX (US); Antti Jaakko Pasanen, Helsinki (FI); Curt Wong, Bellevue, WA (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 268 days.

(21) Appl. No.: 14/781,099

(22) PCT Filed: Mar. 29, 2013

(86) PCT No.: PCT/US2013/034638
§ 371 (c)(1),
(2) Date: Sep. 29, 2015

(87) PCT Pub. No.: WO2014/158190
PCT Pub. Date: Oct. 2, 2014

(65) Prior Publication Data
US 2016/0050544 A1 Feb. 18, 2016

(51) Int. Cl.
*H04W 4/08* (2009.01)
*H04L 12/18* (2006.01)
*H04W 48/10* (2009.01)

(52) U.S. Cl.
CPC .......... *H04W 4/08* (2013.01); *H04L 12/1845* (2013.01); *H04W 48/10* (2013.01); *H04L 12/189* (2013.01)

(58) Field of Classification Search
CPC ........ H04L 67/10; H04L 67/18; H04W 4/023; H04W 88/10; H04W 4/008; H04W 4/02;
(Continued)

(56) References Cited

U.S. PATENT DOCUMENTS

2004/0198397 A1* 10/2004 Weiss ...................... H04W 4/02
455/456.1
2010/0272004 A1 10/2010 Maeda et al.
(Continued)

OTHER PUBLICATIONS

International Search Report and Written Opinion dated Jun. 27, 2013 corresponding to International Patent Application No. PCT/US2013/034638.

*Primary Examiner* — Ayaz R Sheikh
*Assistant Examiner* — Debebe A Asefa
(74) *Attorney, Agent, or Firm* — Squire Patton Boggs (US) LLP (57) ABSTRACT

Various communications may benefit from enhancements for group communication. For example, evolved packet system including an evolved multimedia broadcast/multicast service may benefit from such enhancements. For example, a method may include preparing a list of area names, identities, or both area names and identities to a network element. Moreover, a method may also include requesting the network to broadcast data to a broadcast area defined by the list. The list can define an allowed area, a broadcast area, or both.

19 Claims, 9 Drawing Sheets

(58) Field of Classification Search
CPC ..... H04W 84/12; H04W 88/06; H04W 88/18; H04W 8/08; H04W 92/02; G01S 19/07
See application file for complete search history.

(56) References Cited

U.S. PATENT DOCUMENTS

| | | | |
|---|---|---|---|
| 2012/0176953 A1* | 7/2012 | Chao | H04L 65/4076 370/312 |
| 2013/0007287 A1 | 1/2013 | Chu et al. | |
| 2014/0064177 A1* | 3/2014 | Anchan | H04W 4/08 370/312 |
| 2014/0177506 A1* | 6/2014 | Korus | H04W 4/06 370/312 |
| 2015/0201316 A1* | 7/2015 | Khatibi | H04W 4/02 455/404.2 |

* cited by examiner

ENHANCEMENTS TO EMBMS FOR GROUP COMMUNICATION

BACKGROUND

Field

Various communications may benefit from enhancements for group communication. For example, evolved packet system including an evolved multimedia broadcast/multicast service may benefit from such enhancements.

Description of the Related Art

Evolved Packet System (EPS) is a successor of General Packet Radio System (GPRS), which provides a new radio interface and new packet core network functions for broadband wireless data access. Such EPS core network functions can include the Mobility Management Entity (MME), Packet Data Network Gateway (PDN-GW, P-GW, PGW) and Serving Gateway (S-GW).

A common packet domain Core Network is used for the Radio Access Networks (RAN) GERAN, E-UTRAN and UTRAN. 3GPP specified an architecture for Multimedia Broadcast/Multicast Service (MBMS). Currently the architecture supports broadcast services only.

Figure 1:
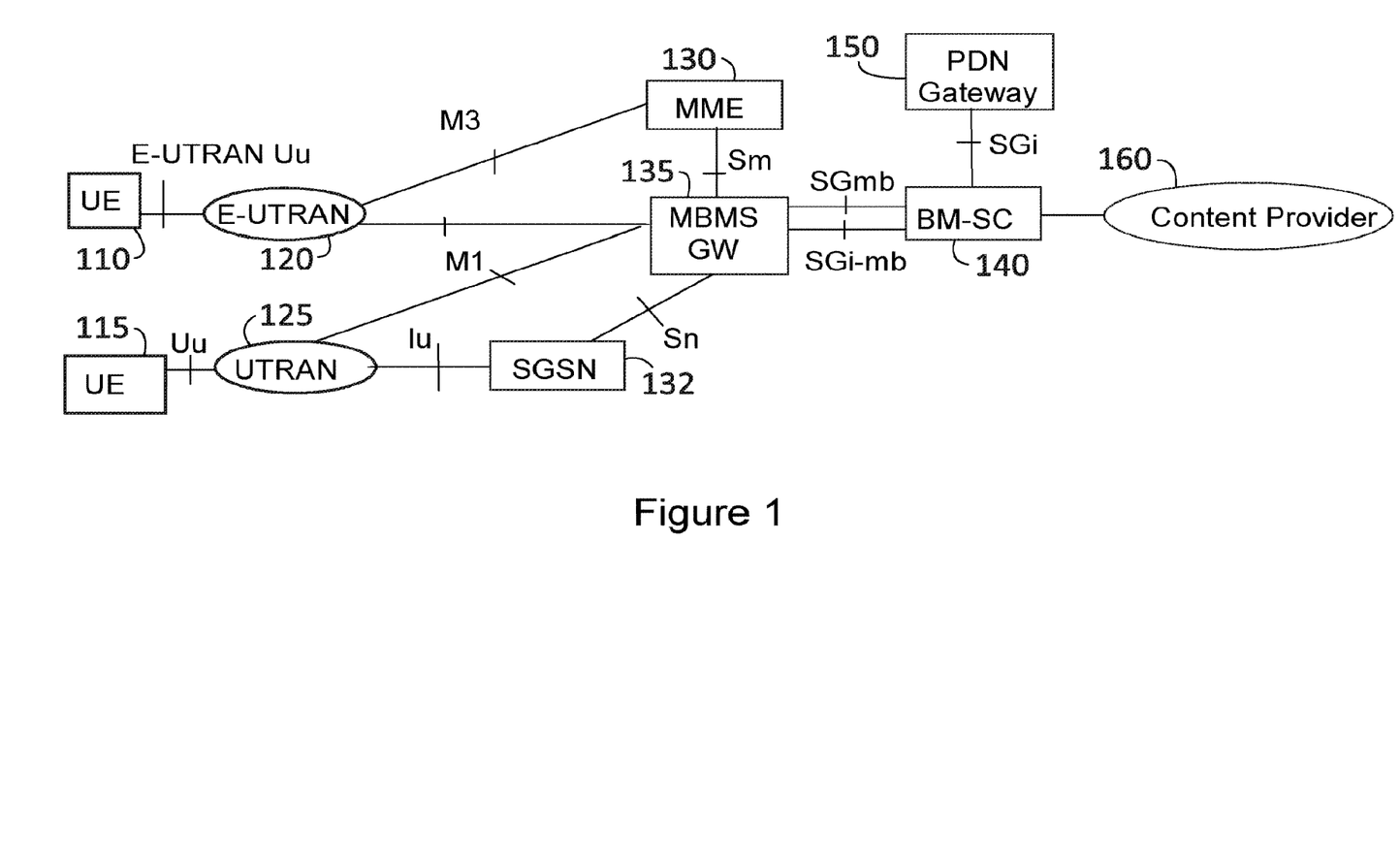
FIG. 1 illustrates a reference architecture for Evolved Packet System.

FIG. 1 illustrates a reference architecture for Evolved Packet System with Universal Terrestrial Radio Access Network (UTRAN) and evolved UTRAN (E-UTRAN), MBMS Broadcast Mode only. As shown in FIG. 1, UEs 110 and 115 can be connected to E-UTRAN 120 and UTRAN 125 over interfaces E-UTRAN Uu or Uu, respectively.

E-UTRAN 120 can be connected to MME 130 over interface M3 and can be connected to MBMS gateway (MBMS GW) 135 over interface M1. The mobility management entity (MME) 130 can be connected to the MBMS GW 135 over interface Sm.

UTRAN 125 can be connected to serving GPRS support node (SGSN) 132 over interface Iu. In turn, the SGSN 132 can be connected to MBMS GW 135 over interface Sn.

The MBMS GW 135 can be connected to BM-SC 140 over interfaces SGmb and SGi-mb. The BM-SC 140 can be connected to PDN Gateway 150 over interface SGi. Likewise, the broadcast-multicast service center (BM-SC) 140 can be connected to the content provider 160 over any suitable interface.

SUMMARY

According to a first embodiment, a method includes preparing a list of area names, identities, or both area names and identities to a network element. The method also includes requesting the network to broadcast data in a broadcast area defined by the list.

According to a second embodiment, a method includes receiving, in a network element of a network, a list comprising at least one of an area name, identity, or group identifier obtained from an application server. The method also includes converting, in the network element, the list into a list of at least one of cell identifiers, or tracking area identifiers as used in the network.

According to a third embodiment, a method includes receiving a request to broadcast data to a group, wherein the request includes a group identifier and/or a list of area names, identities, or both area names and identities. The method also includes converting the group identifier or the list into a plurality of at least one of cell identifiers, or tracking area identifiers as used in the network. The method further includes broadcasting data to the group based on the plurality of at least one of cell identifiers, or tracking area identifiers as used in the network.

According to a fourth embodiment, an apparatus includes at least one processor and at least one memory including computer program instructions. The at least one memory and the computer program instructions are configured to, with the at least one processor, cause the apparatus at least to prepare a list of area names, identities, or both area names and identities to a network element. The at least one memory and the computer program instructions are also configured to, with the at least one processor, cause the apparatus at least to request the network to broadcast data in a broadcast area defined by the list.

According to a fifth embodiment, an apparatus includes at least one processor and at least one memory including computer program instructions. The at least one memory and the computer program instructions are configured to, with the at least one processor, cause the apparatus at least to receive, in a network element of a network, a list comprising at least one of an area name, identity, or group identifier obtained from an application server. The at least one memory and the computer program instructions are also configured to, with the at least one processor, cause the apparatus at least to convert, in the network element, the list into a list of at least one of cell identifiers, or tracking area identifiers as used in the network.

According to a sixth embodiment, an apparatus includes at least one processor and at least one memory including computer program instructions. The at least one memory and the computer program instructions are configured to, with the at least one processor, cause the apparatus at least to receive a request to broadcast data to a group, wherein the request includes a group identifier and/or a list of area names, identities, or both area names and identities. The at least one memory and the computer program instructions are configured to, with the at least one processor, cause the apparatus at least to convert the group identifier or the list into a plurality of at least one of cell identifiers, or tracking area identifiers as used in the network. The at least one memory and the computer program instructions are also configured to, with the at least one processor, cause the apparatus at least to broadcast data to the group based on the plurality of at least one of cell identifiers, or tracking area identifiers as used in the network.

According to a seventh embodiment, an apparatus includes preparing means for preparing a list of area names, identities, or both area names and identities to a network element. The apparatus also includes requesting means for requesting the network to broadcast data in a broadcast area defined by the list.

According to an eighth embodiment, an apparatus includes receiving means for receiving, in a network element of a network, a list comprising at least one of an area name, identity, or group identifier obtained from an application server. The apparatus also includes converting means for converting, in the network element, the list into a list of at least one of cell identifiers, or tracking area identifiers as used in the network.

According to a ninth embodiment, an apparatus includes receiving means for receiving a request to broadcast data to a group, wherein the request includes a group identifier or a list of area names, identities, or both area names and identities. The apparatus also includes converting means for converting the group identifier and/or the list into a plurality of at least one of cell identifiers, or tracking area identifiers as used in the network. The apparatus further includes broadcasting means for broadcasting data to the group based on the plurality of at least one of cell identifiers, or tracking area identifiers as used in the network.

According to tenth, eleventh, and twelfth embodiments, respectively, a non-transitory computer readable medium is encoded with instructions that, when executed in hardware, perform a process, the process comprising the method according to the first, second, and third embodiments, respectively.

According to a thirteenth embodiment, a system includes a first apparatus comprising preparing means for preparing a list of area names, identities, or both area names and identities to a network element and requesting means for requesting the network to broadcast data in a broadcast area defined by the list. The system also includes a second apparatus comprising receiving means for receiving the request to broadcast data to a group, wherein the request includes a group identifier and/or a list of area names, identities, or both area names and identities, converting means for converting the group identifier or the list into a plurality of at least one of cell identifiers, or tracking area identifiers as used in the network, and broadcasting means for broadcasting data to the group based on the plurality of at least one of cell identifiers, or tracking area identifiers as used in the network. The system further includes a third apparatus comprising receiving means for receiving, from the second apparatus, a list comprising at least one of an area name, identity, or group identifier obtained from an application server and converting means for converting the list into a list of at least one of cell identifiers, or tracking area identifiers as used in the network.

BRIEF DESCRIPTION OF THE DRAWINGS

For proper understanding of the invention, reference should be made to the accompanying drawings, wherein.

DETAILED DESCRIPTION

Group communication service enabler for long term evolution (GCSEL) may enable group communication for, among other things, a public safety market over the long term evolution (LTE) of the third generation partnership project (3GPP). According to certain embodiments, the evolved packet system (EPS) can provide a mechanism to send a group communication to all group members within that EPS. Moreover, the network can enable the application layer to restrict group communications for given groups on a per cell(s) or per tracking area basis. Other areas can also be employed, such as a location area or a reporting area.

Thus, in certain embodiments the EPS can enable group communication such that group members may be able to receive and/or transmit only while being served by specific cell(s).

The conventional eMBMS architecture cannot accomplish the above. For example, the application layer can provide MBMS service area (SA) to the BMSC and then the distribution can be based on SA to the corresponding MME(s). The MME may distribute it to all connected MCE or can send it to MCE(s) for the corresponding MBMS SA, for example. Similarly, MCE may send it to connected eNB(s) or to eNB(s) based on MBMS SA. The actual MBMS SA can be configured in the corresponding cells.

The MBMS service area defined for eMBMS, however, may be pre-configured in certain area. For example, each eNB, based on local configuration, can be aware of which service area(s) the eNB belongs to. For GCSE, however, the group call area may not be able to be pre-determined in a static fashion. It needs to be determined in a dynamic fashion, for example, based on the nature/where-about of the incident, and the like. Thus, it may be needed for the GCSE application server to determine the area where group call is applicable. Furthermore, MBMS service area may be defined for a larger area, for example for TV broadcast, while public safety related broadcast may happen only in a limited area, for example a couple of cells. To accommodate this requirement, we need a new form of identifier that can be used for cell specific broadcasting or broadcasting in a smaller area.

By contrast, in certain embodiments, the EPS can provide a mechanism to send a group communication to all group members within that EPS. Moreover, the network can enable the application layer to restrict group communications for given groups on a per cell(s) and/or per traffic area basis. Other granularities of group communication restrictions are also permitted.

Thus, the EPS can enable group communication and group members may be able to receive and/or transmit only while being served by the specific cell(s).

More particularly, certain embodiments may provide a list of area names/identities from a group communication application server to the 3GPP network, for example to the BMSC or optionally to another network entity that communicates with the BMSC afterwards. These area names, which may include 0, 1 or more names, can identify areas where the network is requested to broadcast the application data, including voice, video, data, and/or text. Rules can specify which type of data can be broadcasted. These area names can be, for example, either cell/tracking area identities (Cell ID(s)/TAI(s)) as used by the network operator, names of geographical areas such as "City of London" or "City Center of Paris", geographical co-ordinates such as circles defined by co-ordinates and radius, or any other form of names/identities such as pointers or numbers, which are agreed between service provider and network operator. An empty list or the area name "PLMN," for example, can indicate that the data have to be broadcasted in the whole PLMN.

Certain embodiments, moreover, provide a location mapping function (LMF) configured to allow the conversion of area names/identities provided by the application function to a list of Cell ID(s)/TAI(s) as used in the operator network. The LMF can be located in the operator's network.

Moreover, in certain embodiments the HSS is configured to map Group ID(s) into a list of TAI(s). The HSS can store the list of Group ID(s), where each Group ID of the list can point to the subscription data of all devices belonging to this group. The subscription data can contain the TAI where the device is registered. The TAI can be provided by the serving MME together with MME address to the HSS.

Thus, certain embodiments can also provide a TAI list that can be used for distribution and filtering. Moreover, certain embodiments can provide a broadcast area that can be used to determine the cells where the broadcast should be performed. Furthermore, certain embodiments can provide an option to establish a single bearer between MBMS-GW/P-GW and eNB for eMBMS in E-UTRAN access when broadcasting is performed in a small area.

There may be two types of areas in certain embodiments, an allowed area and a broadcast area. An allowed area can be defined as an area where the user is allowed to receive group communication. If the user moves beyond the allowed area, then the user cannot be involved in group communication. This allowed area can be converted to a TAI list by querying the LMF. The TAI list can be used by BMSC/MBMS-GW to determine the serving nodes by, for example, MME address and can be used by the MME to determine the MCE/eNB.

The broadcast area can be defined as an area where broadcast needs to be performed by the eNB. For example, a broadcast area may be a Cell ID list and/or TAI list.

The group communication server, for example an IMS PoC Server, can indicate the "allowed area" and/or "broadcast area" for this group communication to BMSC when initiating requests for group communication. The LMF, as discussed above, can translate the given list of area names/identities into a list of Cell IDs/TAI(s). This LMF can be invoked by the BMSC, by the V-BMSC if roaming, or by the group communication server, for example, IMS PoC Server. The LMF may be a standalone function or collocated with BMSC, MBMS GW, policy and charging rules function (PCRF), subscriber profile repository (SPR), home subscriber server (HSS), authentication, authorization and accounting (AAA) or any other database in the operator's network.

Figure 2A:
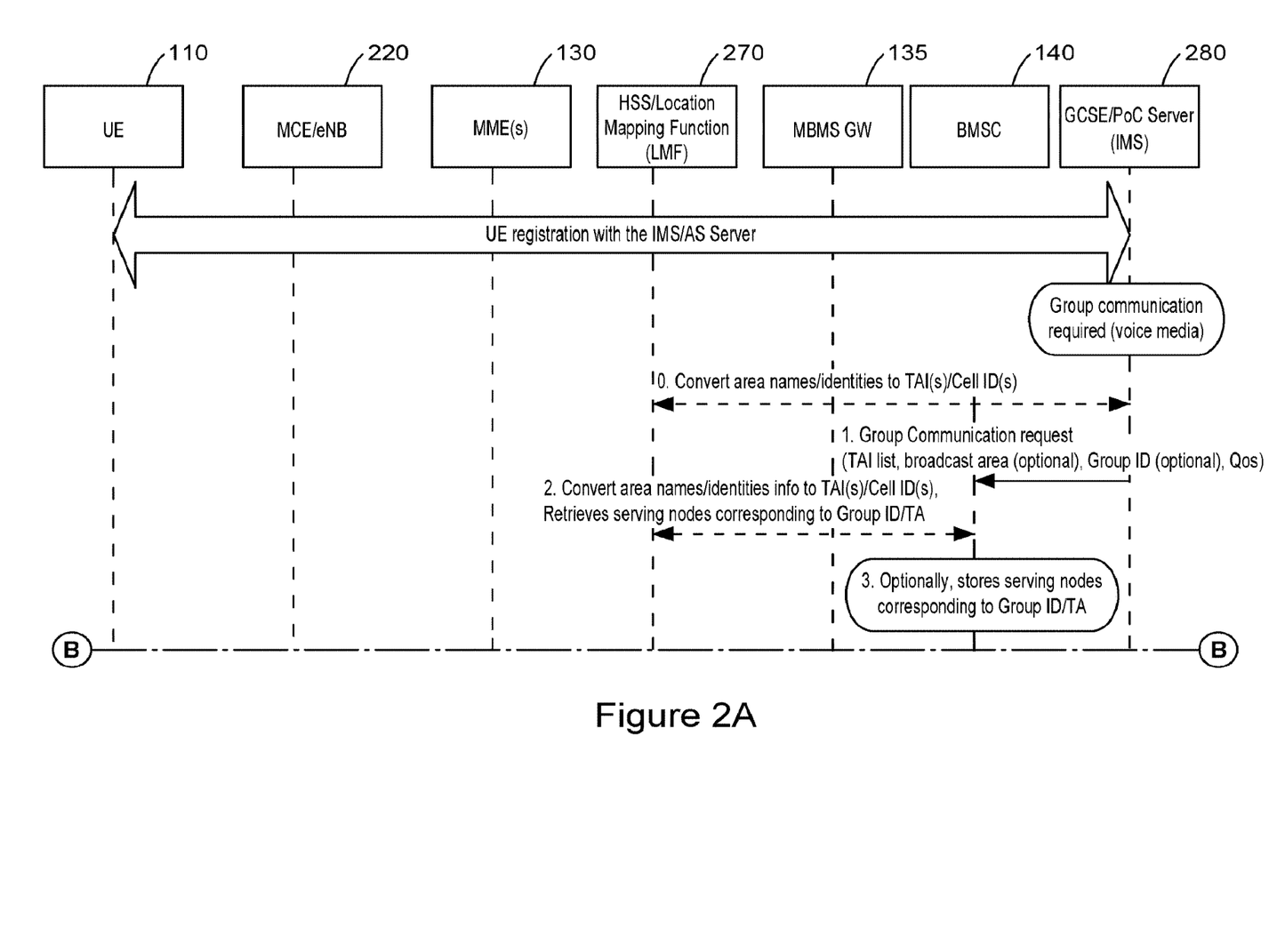
FIG. 2 illustrates MBMS Session Establishment with TAI list, broadcast area using IP multicast, according to certain embodiments.
Figure 2B:
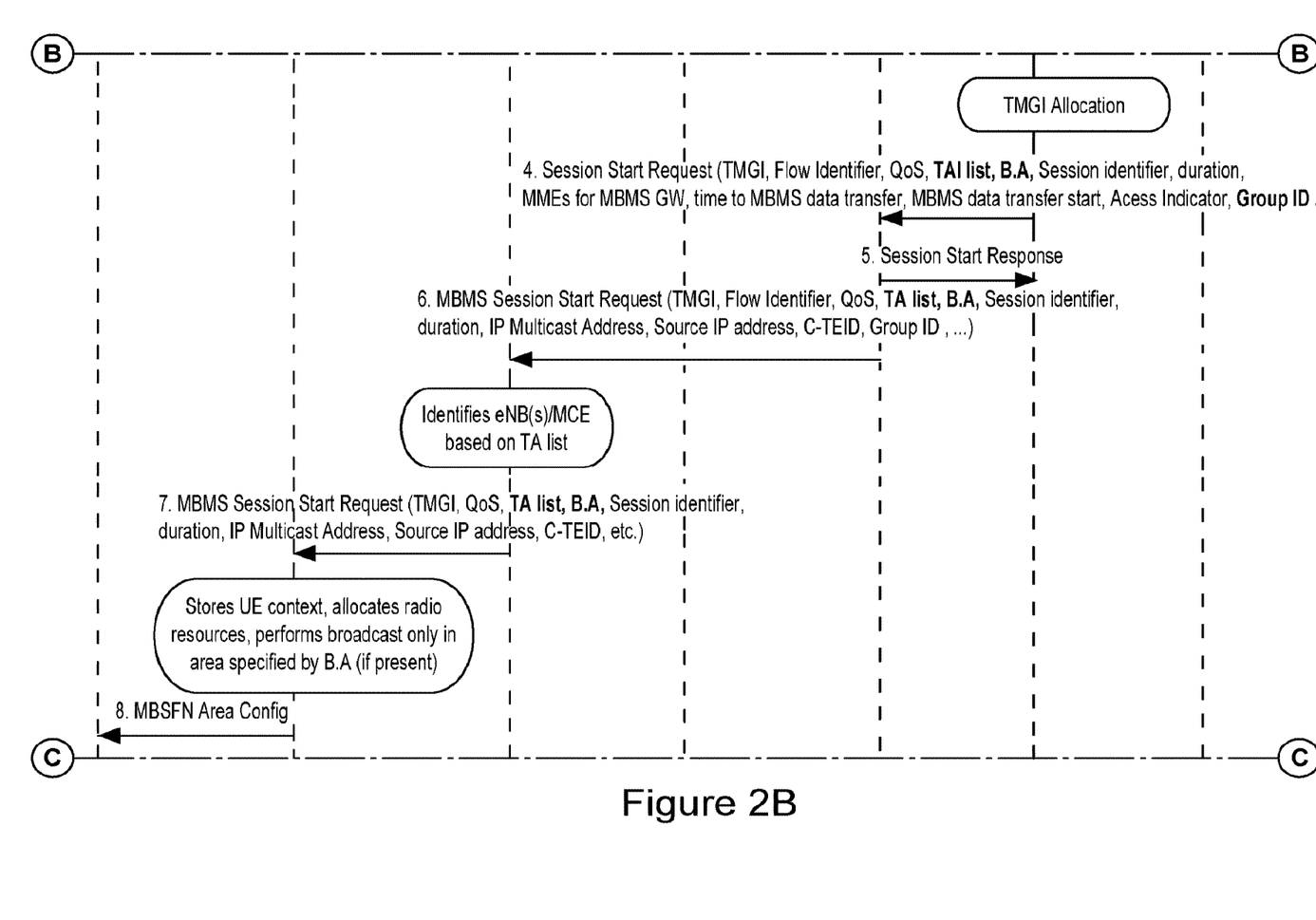
Figure 2C:
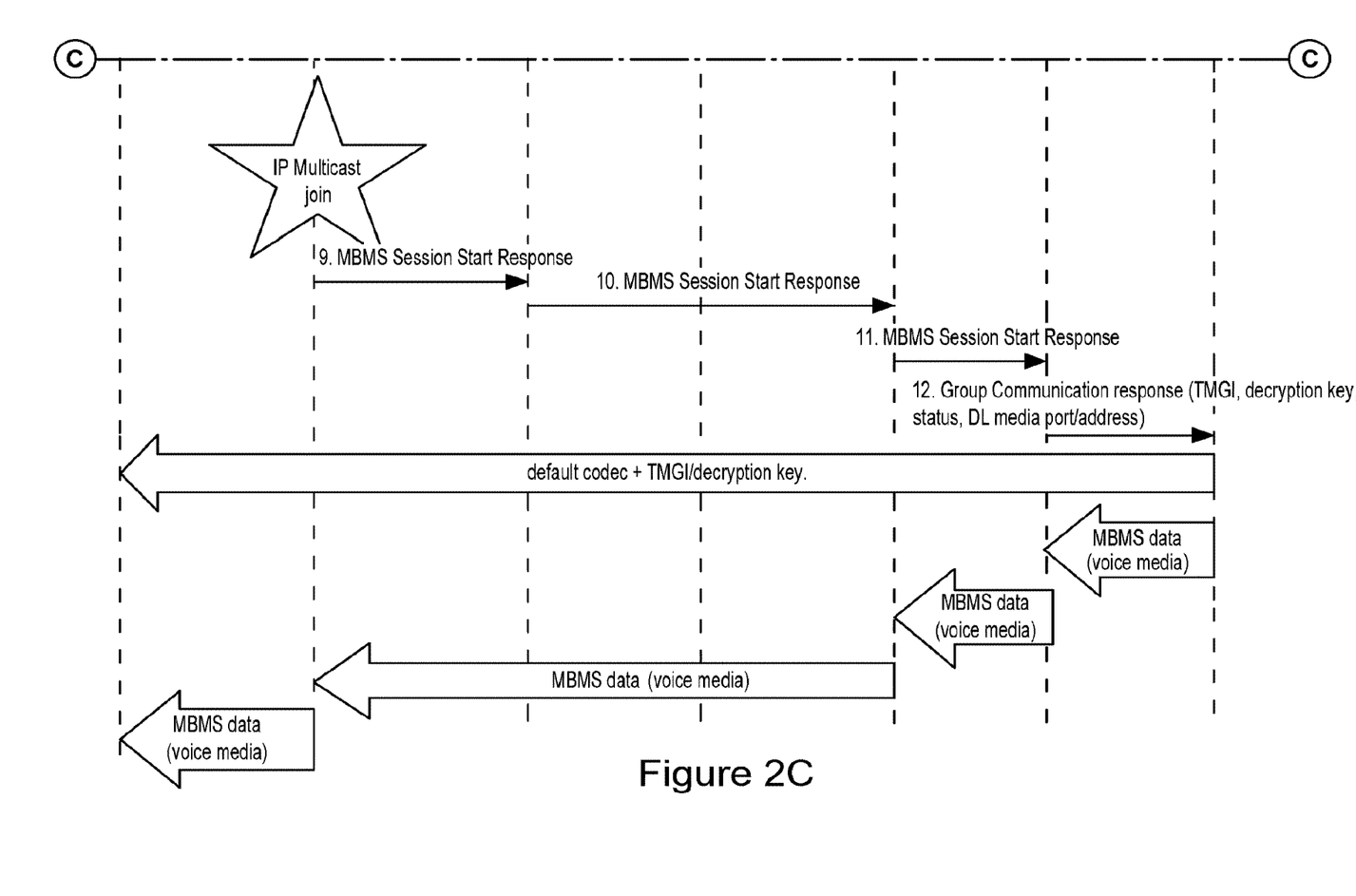
Figure 3A:
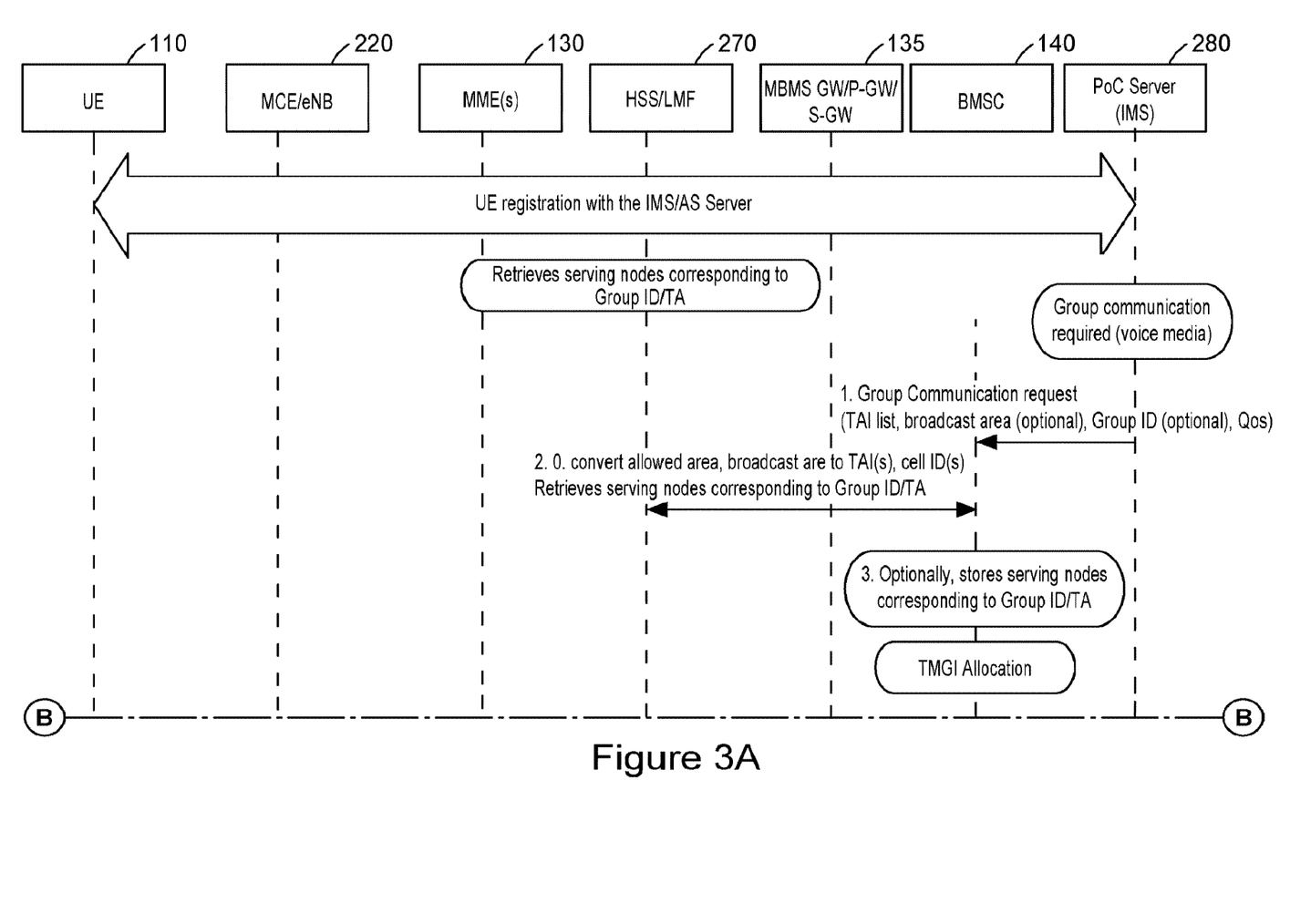
FIG. 3 illustrates MBMS Session Establishment with TAI list, broadcast area using single bearer establishment, according to certain embodiments.
Figure 3B:
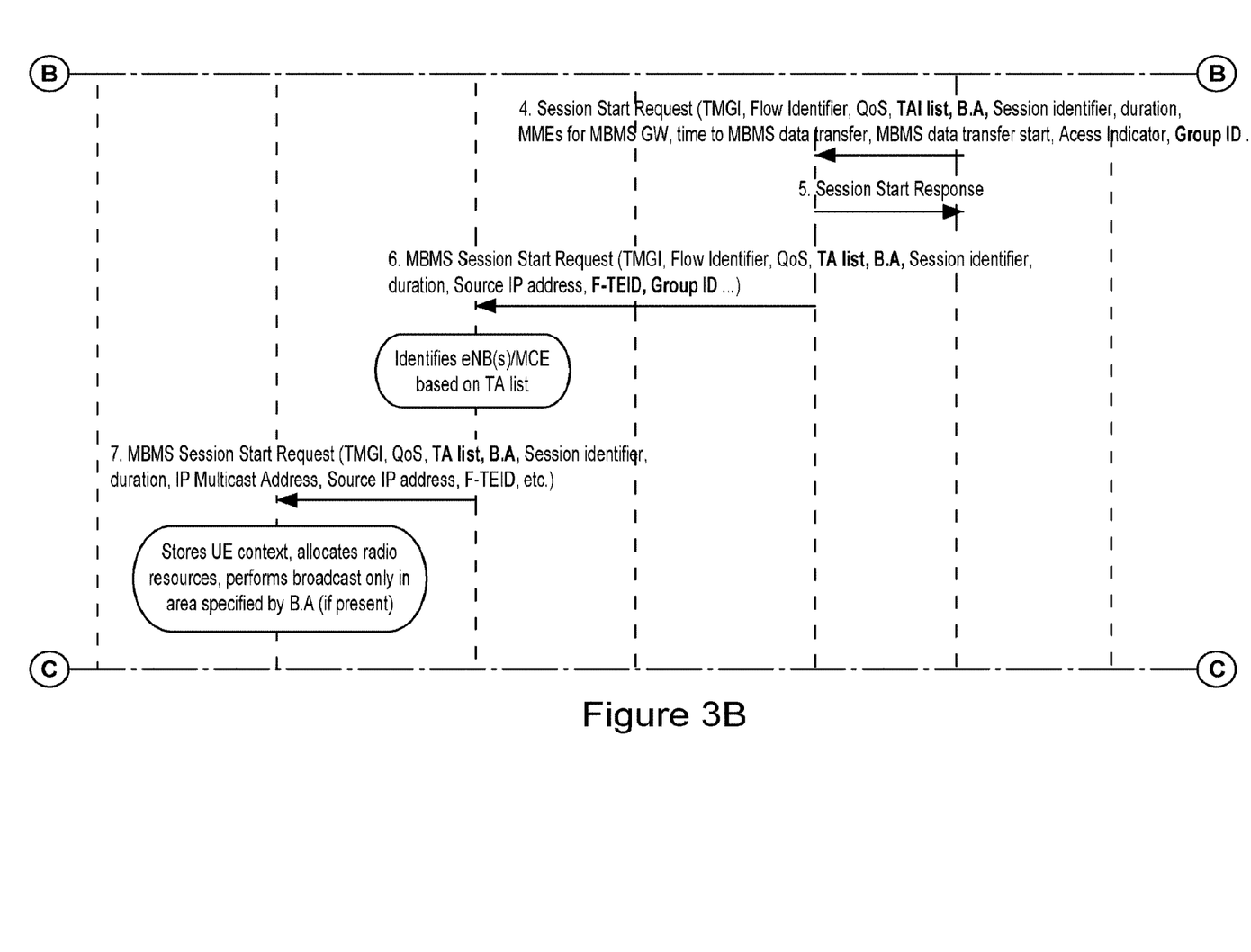
Figure 3C:
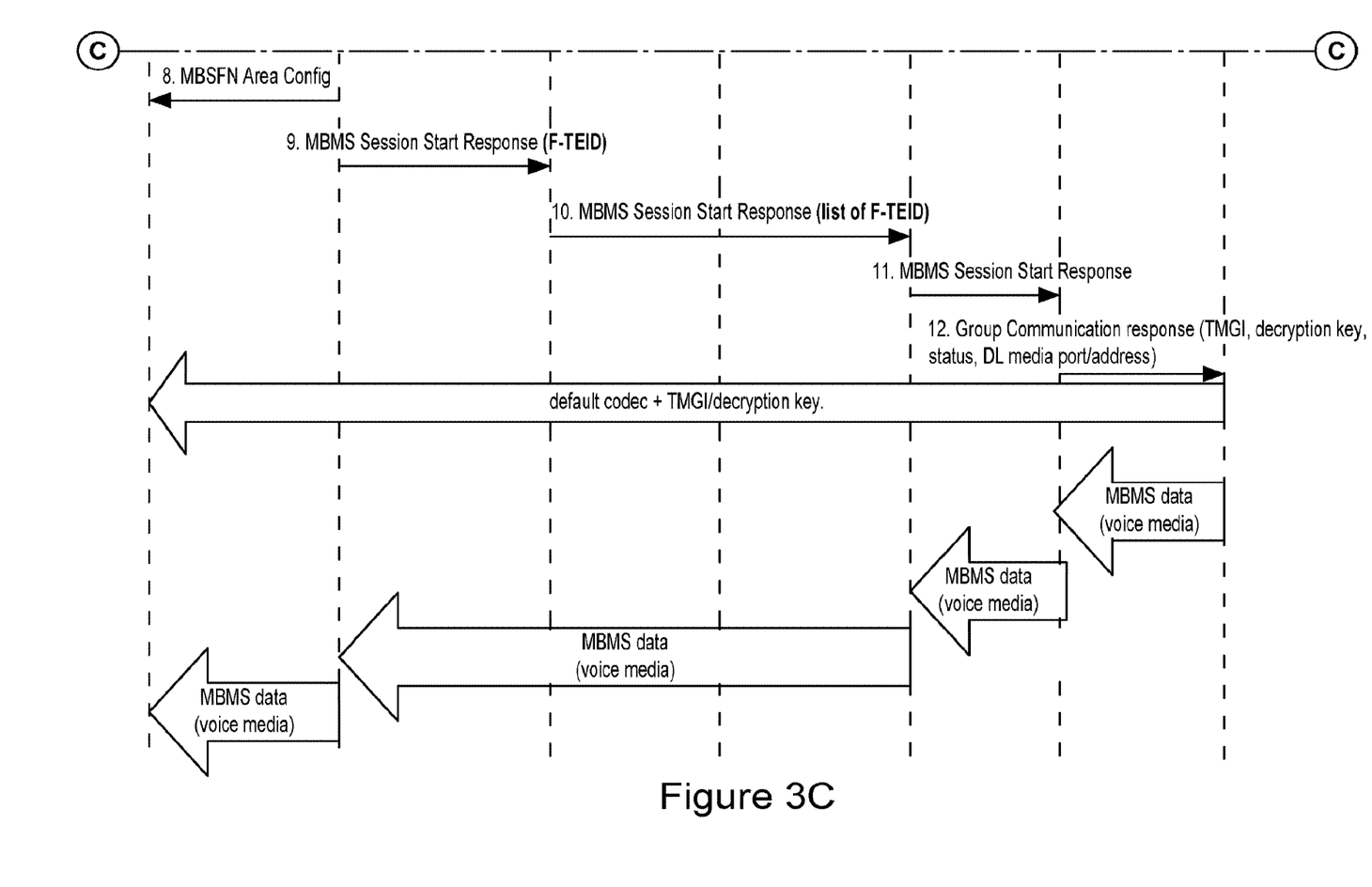

The call flows illustrated in FIGS. 2 and 3 assume that the LMF is collocated with the HSS, although this is not mandatory. The LMF can be invoked by the BMSC, by the V-BMSC in a roaming scenario, by an MBMS GW, or by the group communication server itself. FIGS. 2 and 3 illustrate example non-limiting implementations above the above-described systems and techniques.

FIG. 2 illustrates MBMS Session Establishment with TAI list, broadcast area using IP multicast, according to certain embodiments. At 0, if application server, for example IMS PoC Server 280, has access to LMF 270 of the serving network, IMS PoC Server 280 may convert the allowed area into a list of TAI(s) and broadcast area into a list to TAI(s)/Cell IDs. If not, IMS PoC Server 280 can provide the allowed area and broadcast area in the form of area names/identities to the BMSC 140.

At 1, application server, for example IMS PoC Server 280, can send a group communication request to BMSC 140. If step 0 was not executed, the application server 280 can provide a list of area names/identities. Otherwise, application server 280 can include allowed area as TAI list and broadcast area, which may be optional, as Cell ID list, QoS requirements, priority, which may be optional, and Group ID, which may be optional.

At 2, if TAI list is not received, BMSC 140 may query the LMF 270 to retrieve TAI and Cell ID lists. Based on TAI list, if available, or optionally only Group ID, BMSC 140 may query the HSS 270 or another database to obtain TAI list and optionally also serving node addresses (for example MME(s) 130, MBMS-GW(s) 135). Alternatively, this information, for example mapping of TAI(s) to addresses of the MME(s) 130, can be pre-configured in the BMSC 140.

At 3, alternatively, BMSC 140 may store mapping between TAIs, Group IDs, which may be optional, and serving node addresses. This avoids an extra HSS 270 query.

At 4, BMSC 140 can allocate TMGI and can initiate session start request towards MBMS GW(s) 135. It can provide the TAI list, broadcast area that comprises of cell ID, TAI list, priority, quality of service (QoS), MME 130 identifiers, Group ID along with other parameters.

At 5, MBMS GW 135 can acknowledge and respond back to the BMSC 140 with necessary information to send MBMS data.

At 6, MBMS GW 135 can initiate session start request procedure towards the MME(s) 130 that were provided by the BMSC 140. It can include the necessary parameters such as TA list, Broadcast area, which may be optional, that comprises of cell ID, TAI list, Group ID.

At 7, if TAI list was provided, MME 130 can identify all the MCE/eNB(s) 220 that correspond to the specified TAI list(s) to establish the MBMS session. If such a list was not provided, MME 130 can establish a MBMS session with all the MCE(s)/eNB(s) 220 that are connected to the MME 130. MME 130 can send a session request towards the corresponding MCE(s)/eNB(s) 220 and can forward the necessary parameters including TAI list, broadcast area, or the like.

MCE to eNB 220 interaction is not explicitly shown in this call flow. However, MCE can be required to establish a MBMS session with the eNB(s) 220 that belong to the corresponding TAI(s).

At 8, eNB 220 can identify the cells where the broadcast should be performed using the broadcast area that comprises of cell ID list/TAI list. If broadcast area is not included, eNB 220 can perform broadcasts in all the cells managed by the eNB 220. eNB 220 then can join the IP multicast to receive DL MBMS data.

At 9-11, MBMS session establishment procedure can be completed through responses provided to the MME 130, MBMS GW 135, and BMSC 140.

At 12, BMSC 140 can provide the TMGI, decryption key, DL media port/address, status in a response message back to the application server 280.

FIG. 3 illustrates MBMS Session Establishment with TAI list, broadcast area using single bearer establishment, according to certain embodiments. This can be similar to the call flow illustrated in FIG. 2, for items 0-5.

At 6, MBMS GW 135 can initiate session start request procedure towards the MME(s) 130 that was/were provided by the BMSC 140. MBMS GW 135 can include the necessary parameters such as TA list, Broadcast area, which may be optional, Group ID and F-TEID. MBMS GW 135 can determine whether to perform IP multicast or establish single GTP tunnels based on the number of cell IDs where the broadcast needs to be performed. If the MBMS GW 135 determines that GTP tunnels need to be established, then it can provide F-TEID in the Session Start Request. Otherwise, it can provide an IP multicast address (as in call flow #1) in the Session Start Request.

At 7, if TA list was provided, MME 130 can identify all the MCE/eNB(s) 220 that correspond to the specified TAI list(s) to establish the MBMS session. If such a list was not provided, MME 130 can establish a MBMS session with all the MCE(s)/eNB(s) 220 that are connected to the MME 130. MME 130 can send a session request towards the corresponding MCE(s)/eNB(s) 220 and can forward the necessary parameters including TAI list, broadcast area, F-TEID.

Note: MCE to eNB 220 interaction is not explicitly shown in this call flow. MCE can be required to establish MBMS session with the eNB(s) 220 that belong to the corresponding TAI(s).

At 8, eNB 220 can identify the cells where the broadcasts should be performed using the broadcast area that comprises of cell ID, TAI list. If broadcast area is not included, eNB 220 can perform broadcasts in all the cells managed by the eNB 220. Moreover, eNB 220 can allocate a F-TEID to establish a tunnel and receive DL MBMS data.

At 9-11, completion of MBMS session establishment procedure can occur. This can include forwarding F-TEID from eNB(s) 220 and S-GW if not collocated, towards MBMS-GW/P-GW 135. There are at least two options for this forwarding.

According to a first option, MME 130 can wait until it receives responses from all eNB(s) 220, for a reasonable duration, to receive the F-TEID for user plane prior to responding to MBMS-GW/P-GW 135. MME 130 can then send a list of F-TEIDs to MBMS-GW/P-GW 135.

According to a second option, MME 130 can forward the responses with F-TEID from each eNB 220 to the MBMS-GW/P-GW 135 one at a time. MBMS-GW/P-GW 135 can then wait for a reasonable duration to receive all the responses from MME 130.

At 12, BMSC 140 can provide the TMGI, decryption key, DL media port/address, and status in a response message back to the application server 280.

Figure 4:
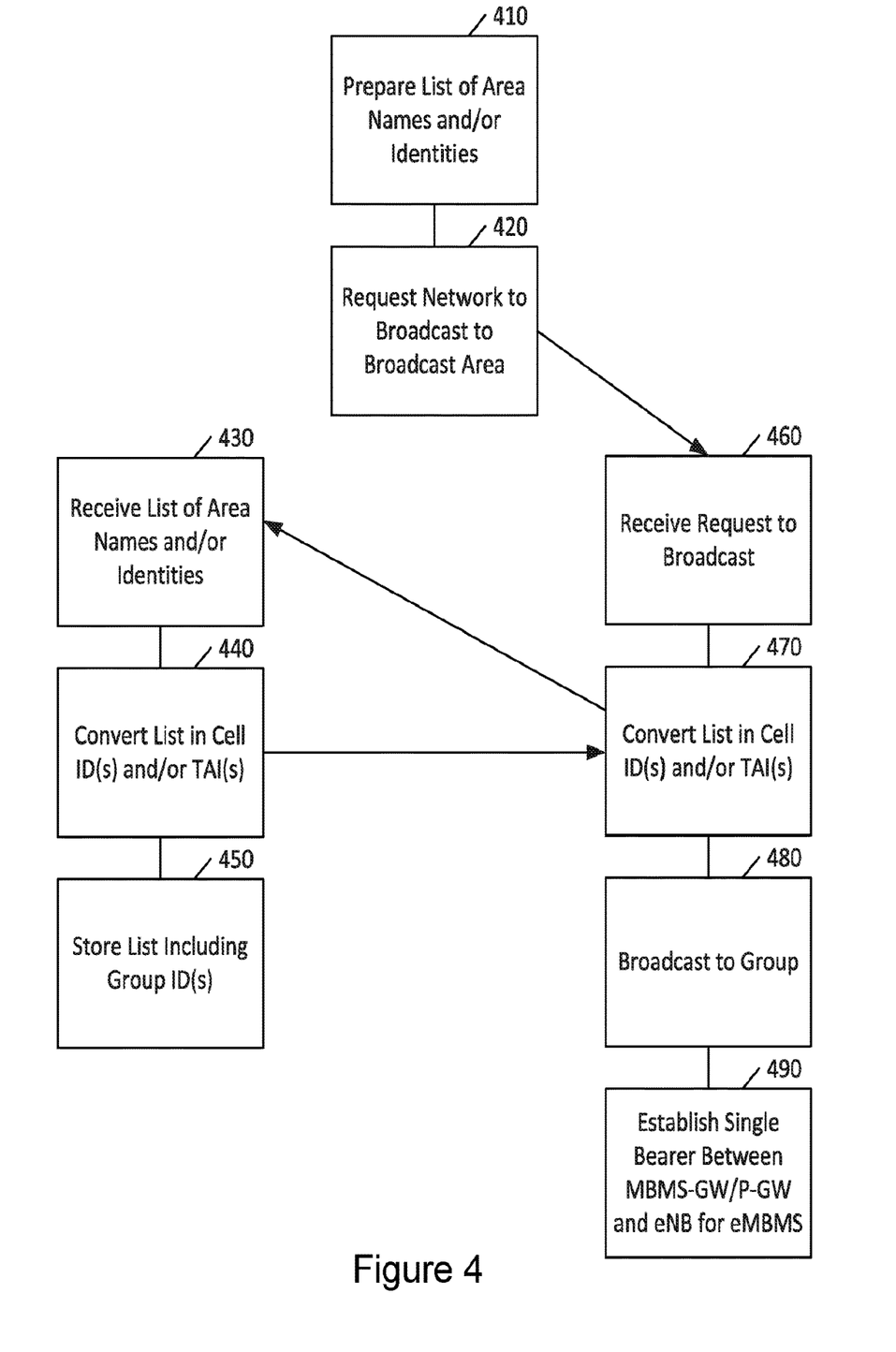
FIG. 4 illustrates a method according to certain embodiments.

FIG. 4 illustrates a method according to certain embodiments. The method can include, at 410, preparing a list of area names, identities, or both area names and identities to a network element. This preparing the list can be performed based on identifying the names or identities based on the locations of particular user equipment, particular properties of interest, or an emergency location, such as the site of a fire, flood, mudslide, crime, terror, or warfare event.

The method can also include, at 420, requesting the network to broadcast to a broadcast area defined by the list. Requesting the network can include requesting a specific element of the network, for example, a BMSC. The preparing and requesting can be performed by an application server. The request can include an "allowed area" and/or "broadcast area" (one or both of these), as defined above.

The area names can include at least one of cell identities, tracking area identities, names of geographical areas, or geographical co-ordinates. The list can be an empty list or a designation of an entire network, when the list is intended to be broadcast to every possible area. For example, the list can simply state "PLMN" when the broadcast is to be sent throughout the entire network.

The method can also include, at 430, receiving, in a network element of a network, a list comprising at least one of an area name, identity, or group identifier obtained from an application server. This can be the same list as the list prepared above.

The method can further include, at 440, converting, in the network element, the list into a converted list of at least one of cell identifiers, or tracking area identifiers as used in the network. The network element performing the receiving and converting can be at least one of a home subscriber server or a location mapping function.

The same network element can, at 450, perform storing the list. The list can include group identifiers. Each group identifier of the list can point to subscription data of all devices belong to the group.

The method can also include, at 460, receiving a request to broadcast to a group, wherein the request includes a group identifier or a list of area names, identities, or both area names and identities. The method can further include, at 470, converting the group identifier or the list into a plurality of at least one of cell identifiers, or tracking area identifiers as used in the network. This converting can be done completely within the network element that receives the request, or can be done by soliciting this information from another network element, such as by the network element that performs 430, 440, and 450 mentioned above. The method can also include, at 480, broadcasting to the group based on the plurality of at least one of cell identifiers, or tracking area identifiers as used in the network.

The method can further include, at 490, establishing single bearer between a gateway, such as an MBMS-GW or P-GW, and an access point, such as an eNB, for evolved multimedia broadcast multicast service in evolved universal terrestrial radio access network access when broadcasting or multicasting is performed in a small area.

Figure 5:
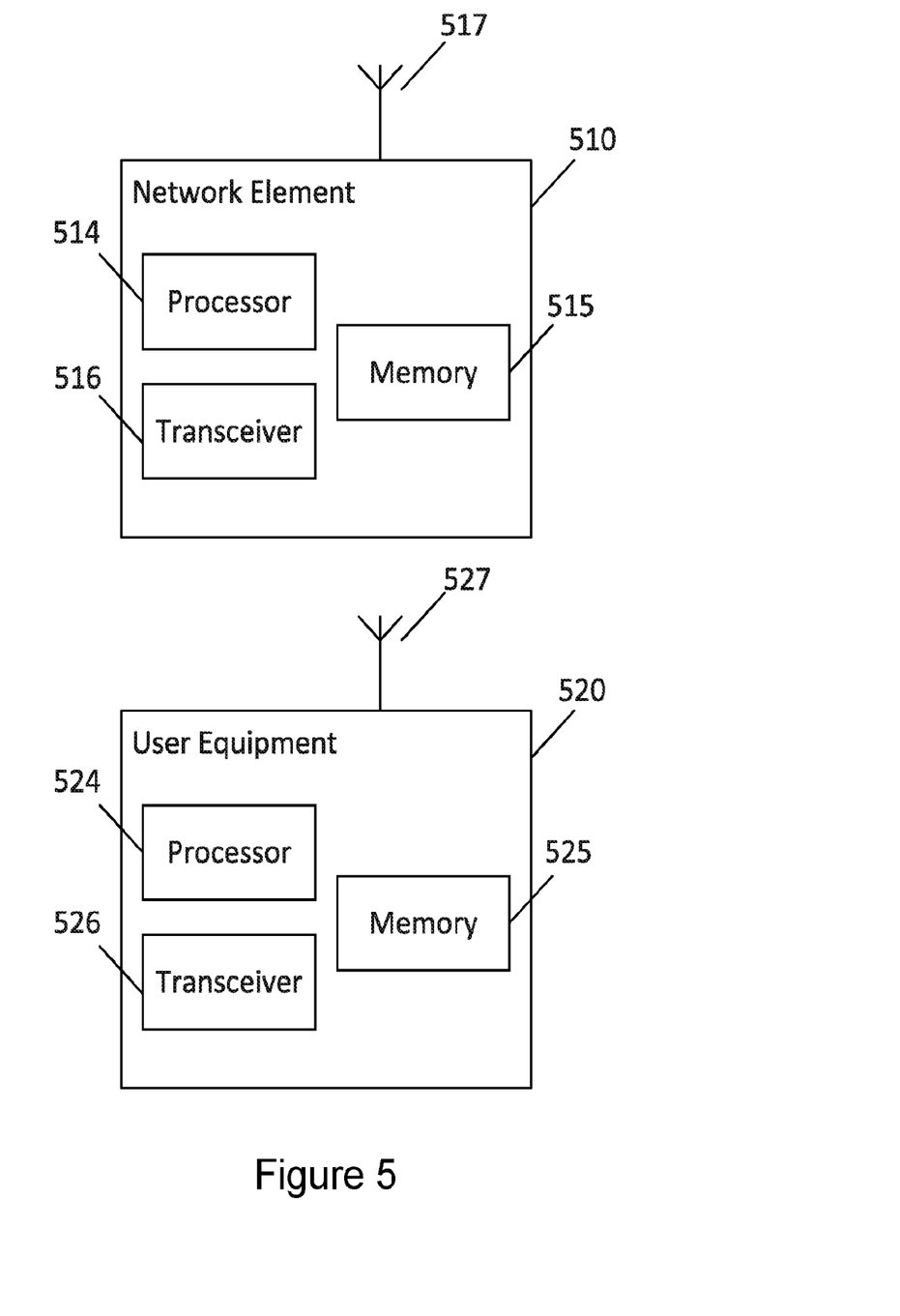
FIG. 5 illustrates a system according to certain embodiments of the invention.

FIG. 5 illustrates a system according to certain embodiments of the invention. In one embodiment, a system may comprise several devices, such as, for example, network element 510 and UE 520. The system may comprise more than one UE 520 and more than one network element 510, although only one of each is shown for the purposes of illustration. A network element can be an access point, a base station, an eNode B (eNB), an MCE, an MME, a gateway, a P-GW, an MBMS GW, a BMSC, an HSS, an LMF, a PoC server, an application server, or any of the other network elements discussed herein, such as those shown in FIGS. 1-3. Each of these devices may comprise at least one processor, respectively indicated as 514 and 524. At least one memory may be provided in each device, and indicated as 515 and 525, respectively. The memory may comprise computer program instructions or computer code contained therein. One or more transceiver 516 and 526 may be provided, and each device may also comprise an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna. Likewise, some network elements 510 may be solely configured for wired communication, and such cases antenna 517 may illustrate any form of wired communication hardware, such as a network interface card.

Transceivers 516 and 526 may each, independently, be a transmitter, a receiver, or both a transmitter and a receiver, or a unit or device that may be configured both for transmission and reception.

Processors 514 and 524 may be embodied by any computational or data processing device, such as a central processing unit (CPU), application specific integrated circuit (ASIC), or comparable device. The processors may be implemented as a single controller, or a plurality of controllers or processors.

Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as network element 510 and UE 520, to perform any of the processes described above (see, for example, FIG. 2-4). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present (see, for example, FIGS. 1-3), or other nodes providing similar functionality, such as nodes that combine the functionality of multiple of the devices shown in FIGS. 1-3, for example a network element that combines a P-GW and an MBMS GW.

Various embodiments may have various benefits, advantages, or features. For example, certain embodiments can provide otherwise missing functionality for eMBMS in EPC. Moreover, certain embodiments can provide distribution and filtering based on TAI list, broadcast based on cell ID list, and thus can allow eMBMS broadcast to be performed with a granularity of a single cell. Certain embodiments provide an option for EPC products to support single bearer establishment for eMBMS procedures thus not requiring them to support IP multicast. With this approach, certain embodiments can ensure that group communication is restricted to "allowed area" and broadcast is not performed outside of a "broadcast area."

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

MBMS Multimedia Broadcast/Multicast Service
MBMS GW MBMS Gateway
MBMS SA MBMS Service Area
MCE Multi-cell/multicast Coordination Entity
BMSC, BM-SC Broadcast-Multicast Service Centre
TMGI Temporary Mobile Group Identity
TAI Tracking Area Identity
SAI Service Area Identity
UE User Equipment
eNB Enhanced NodeB
MME Mobility Management Entity
P-GW Packet Data Network Gateway
SPR Subscription Profile Repository
AAA Authentication, Authorization and Accounting
HSS Home Subscriber Server
QoS Quality of Service
Cell ID Cell Identity
GCSEL Group Communication Service Enabler for LTE
LMF Location Mapping Function
PLMN Public Land Mobile Network
TEID Tunnel Endpoint Identifier
PoC Push-to-Talk over Cellular
IMS IP Multimedia Subsystem
AS Application Server

We claim:
1. A method, comprising:
an application server preparing a list of area names and identities; and
the application server sending a communication message to a broadcast-multicast service center (BM-SC) network element requesting a network to broadcast data in a broadcast area defined by the list, the communication message comprising the list of area names and identities,
wherein the identities are cell identifiers.
2. The method of claim 1, wherein the method is performed by an application server.
3. The method of claim 1, wherein the area names comprise at least one of cell identities, tracking area identities, names of geographical areas, or geographical co-ordinates.
4. The method of claim 1, wherein the list comprises an empty list or a designation of an entire network, when the list is intended to be broadcasted to every possible area covered by the entire network.
5. A non-transitory computer readable medium encoded with instructions that, when executed in hardware, perform a process, the process comprising the method according to claim 1.
6. A method, comprising:
receiving, in a network element of a network, a list comprising names and identities obtained from an application server, the network element being an element distinct from the application server; and
converting, in the network element, the list into a list of at least one of cell identifiers, or tracking area identifiers as used in the network.
7. The method of claim 6, wherein the network element comprises at least one of a home subscriber server or a location mapping function.
8. The method of claim 6, further comprising:
storing the list, wherein the list comprises group identifiers, wherein each group identifier of the list points to subscription data of all devices belong to the group.
9. A method, comprising:
receiving in a second network element, being a hardware entity, of a network a request from a first network element, being a hardware entity, to broadcast data to a group, wherein the request includes a list of area names and cell identities;
converting in the second network element the list into a plurality of at least one of cell identifiers, or tracking area identifiers as used in the network; and
the second network element requesting the broadcasting of data to the group based on the plurality of at least one of cell identifiers, or tracking area identifiers as used in the network.
10. The method of claim 9, further comprising:
establishing single bearer between a gateway and an access point for evolved multimedia broadcast multi- cast service in evolved universal terrestrial radio access network access when broadcasting or multicasting is performed in a small area.

11. An application server apparatus, comprising:
at least one processor; and
at least one memory including computer program instructions,
wherein the at least one memory and the computer program instructions are configured to, with the at least one processor, cause the apparatus at least to
prepare, at a first network element being a hardware entity, a list of area names and identities; and
send by the first network element, a communication message to a broadcast-multicast service center (BM-SC) network element being a hardware entity requesting a network to broadcast data in a broadcast area defined by the list, the communication message comprising the list of area names and identities,
wherein the identities are cell identifiers.

12. The apparatus of claim 11, wherein the apparatus is performed by an application server.

13. The apparatus of claim 11, wherein the area names comprise at least one of cell identities, tracking area identities, names of geographical areas, or geographical coordinates.

14. The apparatus of claim 11, wherein the list comprises an empty list or a designation of an entire network, when the list is intended to be broadcasted to every possible area covered by the entire network.

15. An apparatus, comprising:
at least one processor; and
at least one memory including computer program instructions,
wherein the at least one memory and the computer program instructions are configured to, with the at least one processor, cause the apparatus at least to
receive, in a network element, being a hardware entity, of a network, a list comprising area names and cell identities obtained from an application server, the network element being an element distinct from the application server; and
convert, in the network element, the list into a list of at least one of cell identifiers, or tracking area identifiers as used in the network.

16. The apparatus of claim 15, wherein the network element comprises at least one of a home subscriber server or a location mapping function.

17. The apparatus of claim 15, wherein the at least one memory and the computer program instructions are configured to, with the at least one processor, cause the apparatus at least to store the list, wherein the list comprises group identifiers, wherein each group identifier of the list points to subscription data of all devices belong to the group.

18. An apparatus, comprising:
at least one processor; and
at least one memory including computer program instructions,
wherein the at least one memory and the computer program instructions are configured to, with the at least one processor, cause the apparatus at least to
receive in a network element, being a hardware entity, of a network a request to broadcast data to a group, wherein the request includes a list of area names and cell identities;
convert, by the network element, the list into a plurality of at least one of cell identifiers, or tracking area identifiers as used in the network; and
requesting broadcast, by the network element, of data to the group based on the plurality of at least one of cell identifiers, or tracking area identifiers as used in the network.

19. The apparatus of claim 18, wherein the at least one memory and the computer program instructions are configured to, with the at least one processor, cause the apparatus at least to establish single bearer between a gateway and an access point for evolved multimedia broadcast multicast service in evolved universal terrestrial radio access network access when broadcasting or multicasting is performed in a small area.

* * * * *